Oct. 6, 1970  R. HINDEL  3,532,927
SCINTILLATION DETECTOR INDICATING SYSTEM
Filed June 25, 1968  3 Sheets-Sheet 1

INVENTOR.
ROBERT HINDEL
BY Watts, Hoffmann,
Fisher & Heinke
ATTORNEYS

United States Patent Office 3,532,927
Patented Oct. 6, 1970

3,532,927
SCINTILLATION DETECTOR INDICATING SYSTEM
Robert Hindel, Hamden, Conn., assignor, by mesne assignments, to Picker Corporation, White Plains, N.Y., a corporation of New York
Filed June 25, 1968, Ser. No. 739,889
Int. Cl. H01j 29/70; G01t 1/20
U.S. Cl. 315—18                        22 Claims

ABSTRACT OF THE DISCLOSURE

In a scintillation detector utilizing a cathode ray tube to present a visible spot at a point on its face corresponding to the location of a scintillation in a scintillator, signals whose relative amplitudes are indicative of the location coordinates of the scintillation are subject to controlled decay with their relative amplitude ratios being preserved. A sum or energy signal is similarly treated, and when it has decayed to a reference level, the decayed coordinate signals have properly positioned the cathode ray tube beam to indicate the scintillation location.

REFERENCED PATENT

U.S. Pat. No. 3,011,057, issued Nov. 28, 1961 to Hal O. Anger for "Radiation Image Device."

BACKGROUND OF THE INVENTION

Field of the invention

This invention relates to scintillation detectors, and, more particularly, to an indicating system for properly positioning an indicator to provide a visible indication of the position of a scintillation occurring in a scintillator.

Discussion of the prior art

The referenced patent of Anger describes a device for mapping the distribution of radioactivity in a body, such as a human organ into which a radioactive material has been introduced. The apparatus utilizes a scintillator that emits flashes of light when struck by the radiation from the organ, and the scintillations of visible light are utilized in the mapping process.

In the Anger device, a plurality of phototubes are located adjacent a scintillator, which emits scintillations at locations in the scintillator corresponding to the locations of the X-rays or gamma rays in the body under observation that caused the scintillations. The phototubes are spaced a short distance from the scintillator so that they survey overlapping areas of the scintillator. Thus, each phototube subtends only a portion of each surge of light, and each individual scintillation is reported by several of the phototubes. Each phototube measures the amount of light received by it, and electrical signals from the phototubes are compared in computing circuitry to analyze the location of each scintillation in relation to a predetermined rectangular coordinate system in the scintillator. Signals from the computing circuitry are then applied to a cathode ray tube (CRT) to deflect its electron beam and to make a visible spot on the face of the tube at a point corresponding to the location of the original scintillation in the scintillator. A pulse height selector is utilized to eliminate undesired signals, such as those produced by background and scatter radiation.

Devices such as those described in the Anger patent have been widely accepted and used in the medical arts. However, they are subject to an inherent limitation. Such a system, which utilizes the output of a number of phototubes to obtain the sum signal for the total energy received and decoded position signals for both X and Y coordinates, transmits any statistical fluctuations inherent in the energy analysis of a sum signal to the X and Y positioning signals.

This can best be understood by considering an example. Assume that a scintillation at one position in the scintillator gives rise to X-axis and Y-axis signals of 10, and 5 units, respectively, and to a Z-axis signal of 40 units. This will cause the CRT beam to be positioned and brightened at a certain location on the CRT face. If now another scintillation occurs at precisely the same position in the scintillator, but with less energy than the first scintillation, so as to give rise to a Z-axis signal of 36 units, and hence X-axis and Y-axis signals of 9 and 4.5, respectively, the CRT beam will be positioned and brightened at a different location on the CRT screen than the first. A plurality of scintillations occurring at the same position in the scintillator, but with different energy levels, cause the CRT beam to be positioned and brightened at different locations. This causes a line to appear on the CRT instead of a spot to indicate scintillations occurring at the same point.

The user of such a system is forced because of this to limit the acceptable range of sum signals which seriously limits the total count rate obtainable. To avoid this shortcoming, ratio circuits have been devised to position the beam of the CRT not according to the absolute amplitudes of the X-axis and Y-axis signals, but according to the ratios of the amplitudes of these signals to the energy or sum signal. One known circuit of this type utilizes the non-linear characteristics of diodes to obtain a first approximation to a ratio. Other circuits use the logarithmic characteristics of semiconductors for the same purpose.

Ratio circuits of the types noted also have disadvantages, however. For example, they are generally sensitive to temperature variations, and also require precise matching of the characteristics of active components. Therefore, it is a primary and general object of the present invention to provide an indicating system that is not subject to the foregoing disadvantages.

SUMMARY OF THE INVENTION

The present invention is based on the premise that electrical signals that are subjected to exponential decay will preserve their relative amplitude ratios as long as the decay time constants are equal. As applied to the scintillation detector indicating system of the invention, described illustratively in the context of an Anger camera, this means that the sum signal and the decoded X-axis and Y-axis position signals derived from a phototube array and computing circuitry such as that described by Anger must have exactly the same decay time constants. This is carried out by using inactive components, which are not subject to changes in characteristics due to temperature variations and which are easily matched with each other.

The sum or energy pulse (known as the Z-axis signal) is provided to a pulse stretcher and controlled decay circuit, which is actuated if the pulse height is above a predetermined level. The decoded X-axis and Y-axis pulse signals are similarly provided to respective pulse stretcher and controlled decay circuits. At a predetermined time after the simultaneous start of the three pulses, the pulses are all subjected to controlled exponential decays. When the Z-axis signal has decayed to a predetermined reference level, the decays of all of the signals are stopped and their amplitude levels at that time are maintained for an additional period of time (known as the stretch period). It is during that additional or stretch period of time when the levels of the three signals are being maintained constant that the Z-axis signal is utilized to brighten the trace on a CRT, whose beam is deflected at that time in a rectangular coordinate system in accordance with the decayed X-axis and Y-axis signals.

The original amplitude ratio of the X-axis and Y-axis signals to the Z-axis signal is maintained through the controlled decay period and through the stretch period. Because the CRT trace is not brightened until the Z-axis signal has decayed to a predetermined level, the position of the beam on the cathode ray tube will be strictly in accordance with the ratios of the amplitudes of the X-axis and Y-axis signals to the Z-axis signal at that time, and will be independent of any amplitude variations in the original Z-axis or sum signal transmitted to the X-axis and Y-axis signals. Thus, when scintillations occur at the same position in the scintillator, they will be reproduced on the cathode ray tube screen as a spot rather than a line, regardless of whether or not they are all of the same energy level.

In the numerical example previously given, one scintillation caused X, Y and Z-axis signals of 10, 5 and 40 units respectively. A second scintillation at the same position caused X, Y and Z-axis signals of 9, 4.5 and 36 units, respectively. In accordance with the present invention, all three signals would be permitted to decay at rates relatively proportional to their respective amplitudes until the Z-axis signal reaches a level of, for example, 32 units before the CRT trace is brightened. At that time, the X and Y-axis signals of both sets would be approximately 8 and 4 units, respectively. Thus the CRT beam would be positioned and brightened at the same location in response to both scintillations to provide a single spot rather than two spots, or a line in the case of many scintillations of different energy levels occurring at the same position in the scintillator.

DESCRIPTION OF A PREFERRED EMBODIMENT

Figure 1:
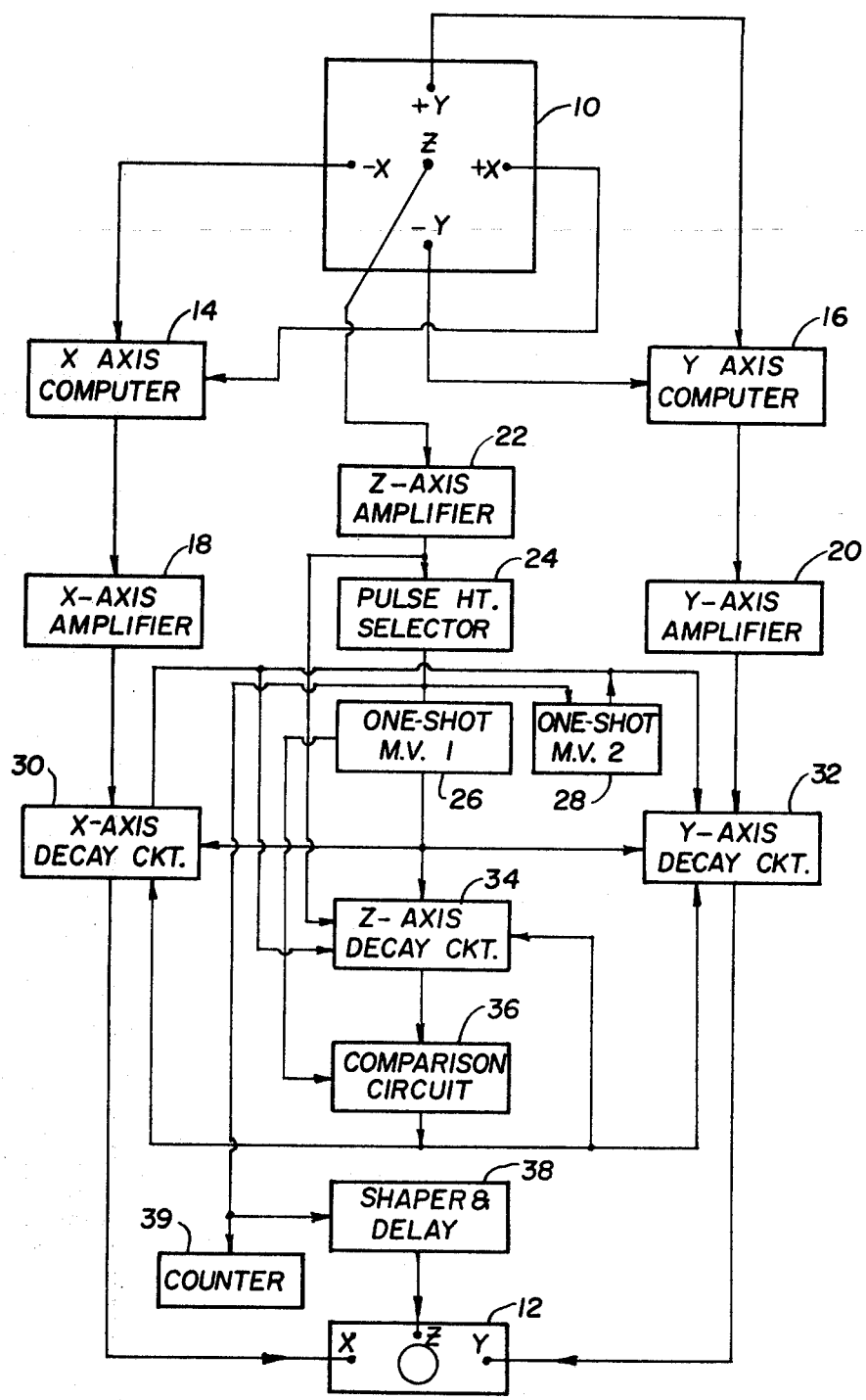
FIG. 1 is a plot diagram of a scintillation detector indicating system embodying the invention.
Figure 2:
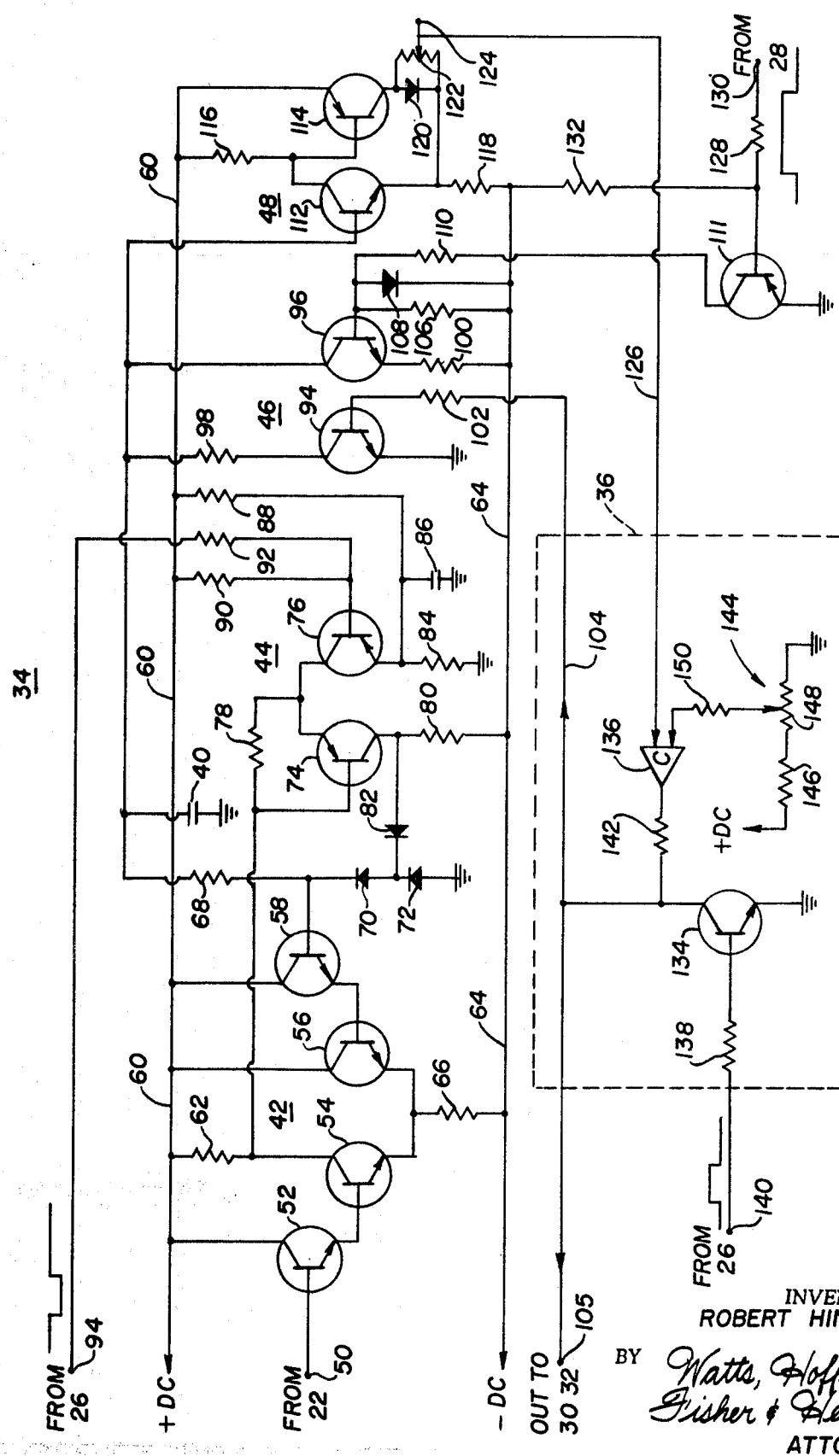
FIG. 2 is a schematic diagram of a typical pulse stretcher and controlled decay circuit and a comparator shown in block form in FIG. 1.

The system shown in FIG. 1 is well adapted for use with the plurality of photocells and summing resistors shown in FIG. 2 of the referenced Anger patent. That array is indicated in FIG. 1 of this application by a block 10, and will be referred to as the "camera." It is to be understood, however, that the present invention is not limited to the use of the particular arrangement disclosed by Anger or to any other specific arrangements. It is sufficient if electrical pulse signals are provided to the indicating system whose relative amplitudes are indicative of a location, relative to X and Y-axes of a rectangular coordinate system, of a point or spot of light that is to be visibly displayed on a screen of a cathode ray tube 12. In addition, a Z-axis signal should be provided, which represents the total energy radiated from the point or spot without coordinate information.

Assume for purposes of illustration that the camera 10 is of the type disclosed in the Anger patent. In that case, the X and Y-axes are assumed to intercept substantially at the center point of the field of view of the camera 10. Thus, signals are provided from phototubes located on the X-positive side and on the X-negative side of the Y-axis. These signals are provided to an X-axis computer circuit 14. Similarly, signals are provided from the phototubes lying on the Y-positive side and on the Y-negative side of the X-axis. These signals are provided to a Y-axis computer circuit 16. The X-axis and Y-axis computer circuits 14, 16 perform the same general functions as corresponding circuits described in the Anger patent. However, in the Anger system, each of those circuits provides both positive and negative output signals to respectively indicate locations on positive and negative sides of the X and Y-axes. In the present case, because of the circuitry to be later described, the computer circuits 14, 16 are so designed as to provide only positive output signals. A signal that would provide a large negative output from the corresponding circuit in the Anger patent would provide a small positive output in the present case. Similarly, a signal that would provide a large positive output in the Anger system would provide a much larger positive output in the present system. In other words, the computer circuits 14, 16 effectively shift the X and Y axes so that they intersect at a point offset from the center of the camera field of view. This makes absolutely no difference so far as the display appearing on the cathode ray tube 12 is concerned, and is merely a design expedient.

If desired, the same computer circuits may be used as in the Anger design, and the following circuitry modified to accept and act on both positive and negative signals. This is considered to be well within the scope of the invention.

Output signals from the X-axis and Y-axis computer circuits 14, 16 are respectively provided to an X-axis amplifier 18 and a Y-axis amplifier 20. The output signals of all of the phototubes in the camera 10 are summed, as in the Anger patent, and supplied to the input of a Z-axis amplifier 22. The amplifiers 18, 20, 22 are conventional pulse amplifiers such as are well known in the art.

The amplified output signals from the X-axis amplifier 22 are provided as input signals to a pulse height selector 24. The pulse height selector 24 is of conventional well-known type, and is adjusted to provide a positive output pulse signal only when its input pulse signal falls within a predetermined amplitude range. That range would, of course, be adjusted so that the pulse height selector would pass signals resulting from impingement of certain desired energy level gamma-rays on the camera scintillator. The acceptance range of the pulse height selector may, as a result of the present invention, be made wide enough to accept sum signals having certain expected statistical variations in amplitude without adversely affecting the display.

The positive output pulse signals from the pulse height selector 24 are provided to two one-shot multivibrators 26, 28 that provide timing and control signals for the remainder of the indicating system. When a positive pulse signal is received from the pulse height selector 24 by the one-shot multivibrator 26, it provides two relatively square-wave output signals of opposite polarity. One of the two output signals of the multivibrator 26 is provided to X-axis, Y-axis and Z-axis pulse stretcher and controlled decay circuits 30, 32, 34. The second signal from the multivibrator 26 is provided as one input to a comparison circuit 36.

The output pulse from the pulse height selector 24 is also provided to the second one-shot multivibrator 28, which provides a positive-going, substantially square signal to the decay circuits 30, 32, 34. The signal provided by the multvibrator 28 is of much greater duration than that provided by the multivibrator 26. The purposes of the signals provided by the multivibrators 26, 28 will be later described in detail.

The controlled decay circuits 30, 32, 34 may be identical in construction. Their purpose is respectively to receive X-axis, Y-axis and Z-axis signals and operate on those signals in such a manner as to properly position the electron beam of the CRT 12, and in the case of the Z-axis signal, to cause brightening of the CRT trace after the beam has been properly positioned by the X-axis and Y-axis signals. The X-axis, Y-axis and Z-axis decay circuits 30, 32, 34 respectively receive positive-going pulse signals from the amplifiers 18, 20, 22. The decay circuits 30, 32, 34 respectively stretch their input pulses for a predetermined length of time, and then subject those pulses to a controlled decay. The decay of all three pulses is terminated when the X-axis pulse has decayed to an amplitude level just slightly less than a reference level preset into the comparison circuit 36. When this occurs, the comparison circuit 36 provides signals to all three of the decay circuits 30, 32, 34 to cause those circuits to maintain the amplitude level of the decaying pulses existing at that time. In other words, the X-axis and Y-axis pulses are stretched over a period of time at the amplitude level they have attained when the Z-axis pulse has decayed to the reference level. It is during that stretching period that the Z-axis pulse causes the trace on the CRT to be brightened. At that time, the electron beam of the CRT is positioned in accordance with an X-axis and Y-axis signal amplitudes.

The output pulses of the X-axis and Y-axis decay circuits 30, 32 are provided in their entirety to the X and Y deflection means of the CRT 12. However, the CRT trace is brightened only during the stretch period of the X and Y-axis signals. Thus, a pulse shaper and delay circuit 38 receives the output pulse from the pulse height selector 24, shapes it and delays it, and provides a substantially square-wave pulse to the brightness control means of the CRT 12 during that period of time when the X-axis and Y-axis positioning signals are in their stretch period. The output pulses from the selector 24 may also be provided to a conventional pulse counter 39 to indicate total count, or to a rate meter (not shown) to indicate count rate. Inasmuch as the Z-axis signal (sum signal) decays at a rate proportional to its amplitude to a predetermined, constant reference level before the trace on the CRT is brightened, and the X-axis and Y-axis signals decay at rates relatively proportional to their respective amplitudes, a spot will appear on the CRT screen at exactly the same position for each scintillation detected by the camera 10 in the same position, regardless of the energy content of the particular scintillation. Thus, the primary object of the invention is attained.

FIG. 2 is a schematic diagram of any one of the decay circuits 30, 32, 34 and the comparison circuit 36. Inasmuch as the decay circuits 30, 32, 34 are identical, but only the Z-axis decay circuit 34 provides an output to the comparison circuit 36, it is assumed for purposes of illustration that FIG. 2 illustrates the decay circuit 34 in conjunction with the comparator circuit 36.

As shown in FIG. 2, the heart of the decay circuit is a capacitor 40, one side of which is grounded. The other side of the capacitor 40 is connected to a peak detector, shown generally by the numeral 42, to a charging circuit shown generally by the numeral 44, to a discharge circuit shown generally by the numeral 46, and to an output buffer stage shown generally by the numeral 48.

The peak detector 42 compares the voltage existing across the capacitor 40 with an input signal provided to a terminal 50. If the signal provided to the terminal 50 is of lesser amplitude than the signal appearing across the capacitor 40, the charge across the capacitor 40 remains unchanged. If the signal appearing on the input terminal 50 is larger in amplitude than the voltage across the capacitor 40, the capacitor 40 is permitted to charge to the amplitude level of the input signal appearing on the terminal 50. The peak dectector 42 comprises four NPN transistors 52, 54, 56, 58. The transistors 52, 54 are connected in Darlington configuration with the emitter of the transistor 52 connected directly to the base of the transistor 54. The collector of the transistor 52 is connected to a line 60 that is provided with a +DC voltage from a conventional source (not shown). The collector of the transistor 54 is also connected to the +DC line 60 through a resistor 62, and the emitter of the transistor 54 is connected to a line 64 through a resistor 66. The line 64 is supplied with a negative DC voltage from a conventional source (not shown).

The transistors 56, 58 are also connected in Darlington configuration, with both of their collectors being connected directly to the +DC line 60. The emitter of transistor 58 is connected directly to the base of the transistor 56, and the emitter of the transistor 56 is connected to the emitter of the transistor 54 and hence to the —DC line 64 through the resistor 66. The base of the transistor 58 is connected to the ungrounded side of the capacitor 40 through the resistor 68 and to ground through two series-connected diodes 70, 72, so poled as to prevent discharge of the capacitor 40 through them to ground.

The charging circuit 44 comprises a pair of PNP transistors 74, 76. The emitter of the transistor 74 is connected directly to the collector of the transistor 76, and they are both connected to the collector of the transistor 54 in the peak detector 42 through a resistor 78. The base of the transistor 74 is connected directly to the collector of the transistor 54. The collector of the transistor 74 is connected to the —DC line 64 through a resistor 80. The collector of the transistor 74 is also connected through a diode 82 to the juncture of the diodes 70, 72 in such a manner that current may flow through the transistor 74, the diodes 82, 70, and the resistor 68 to charge the capacitor 40. The emitter of the transistor 76 is connected to ground through a resistor 84 connected in parallel with a capacitor 86. The emitter of the transistor 76 is also connected to the +DC line 60 through a resistor 88. The base of the transistor 76 is connected to the +DC line 60 through a resistor 90, and is also connected through a resistor 92 to a terminal 94. The terminal 94 is connected to receive a negative-going gate signal from the first one-shot multivibrator 26 shown in FIG. 1.

The purpose of the transistors 74, 76 is to control the charging period of the capacitor 40. When both transistors 74, 76 are conducting, the capacitor 40 charges through a path from the +DC line 60, through the resistor 88, the transistor 76, the transistor 74, the diodes 82, 70, and the resistor 68. If either of the transistors 74, 76 is non-conductive, the charging path is broken and the capacitor 40 cannot charge.

The capacitor discharge circuit 46 comprises two NPN transistors 94, 96. The collector of the transistor 94 is connected to the ungrounded side of the capacitor 40 through a resistor 98 and the emitter is connected directly to ground. The collector of the transistor 96 is connected directly to the ungrounded side of the capacitor 40, and the emitter of that transistor is connected to the —DC line 64 through a load resistor 100. The base of the transistor 94 is connected through a resistor 102 to an output lead 104 from the comparison circuit 36. The lead 104 is also connected to an output terminal 105, from which signals are supplied to the X and Y-axis decay circuits 30, 32. The base of the transistor 96 is connected to the —DC line 64 through a resistor 106 connected in parallel with a diode 108. The base of the transistor 96 is also connected through a resistor 110 to the collector of a PNP transistor 111, whose function will be later described. The function of the transistor 94 is to provide a controlled exponential decay of the charge across the capacitor 40. The function of the transistor 96 is to provide complete and rapid discharge of the capacitor 40.

The buffer output stage 48 comprises an NPN transistor 112 and a PNP transistor 114. The collector of the transistor 112 is connected directly to the base of the transistor 114, and they are both connected to the +DC line 60 through a resistor 116. The base of transistor 112 is connected to the ungrounded side of capacitor 40. The emitter of the transistor 114 is connected directly to the +DC line 60. The emitter of the transistor 112 is connected to the—DC line 64 through a resistor 118, and is also connected to the cathode of a diode 120, whose anode is connected to the collector of the transistor 114. An output potentiometer 122 is connected across the diode 120, and the movable arm of the potentiometer 122 is connected to an output terminal 124 and to an input lead 126 to the comparison circuit 36. In the case of the X-axis and Y-axis decay circuits 30, 32, the respective output terminals 124 are connected to the X-axis and Y-axis deflection means of the CRT 12 (shown in FIG. 1). In the case of the Z-axis decay circuit 34, the output terminal 124 is unused.

As was previously mentioned, the base of the transistor 96 is connected through a resistor 110 to the collector of the transistor 111. The purpose of the transistor 111 is to turn on the transistor 96 at the end of a measurement period to discharge the capacitor 40 rapidly to ground potential. The emitter of the transistor 111 is grounded, and its base is connected through a resistor 128 to an input terminal 130. The terminal 130 is connected to receive a positive-going pulse from the second one-shot multivibrator 28 whose termination terminates a measurement period. The base of the transistor 111 is also connected to the —DC line 64 through a resistor 132.

The comparison circuit 36 comprises essentially an NPN transistor 134 and a voltage comparator 136. The base of the transistor 134 is connected through a resistor 138 to an input terminal 140 which receives a positive-going gate signal from the first one-shot multivibrator 26. This signal is the inverse of that provided to the terminal 94 and thence to the base of the transistor 76 in the charging circuit 44. The emitter of the transistor 134 is grounded, and the collector is connected directly to the output line 104. The output line 104 is also connected through a resistor 142 to the output of the comparator 136.

The comparator 136 is of conventional well-known design to compare the amplitude of an input signal on the line 126 with a reference signal derived from a voltage divider indicated generally by the numeral 144. The voltage divider 144 comprises a fixed resistor 146 and a potentiometer 148 connected in series between ground and a source of +DC voltage (not shown). The movable arm of the potentiometer 148 is connected through a resistor 150 to one input of the comparator 136. The function of the comparator 136 is to provide a high output signal when the positive signal present on the input lead 126 has an amplitude greater than the amplitude of the reference signal obtained from the voltage divider 144, and to provide a low output signal when the input signal on the lead 126 has decayed to an amplitude just less than the reference signal amplitude. That low signal on the output lead 104 serves to cut off the transistor 94 in the discharge circuit 96 and stretch the output pulse present at the terminal 124 until amplitude measurements are completed and the transistor 96 conducts.

In considering the operation of the circuitry shown in FIG. 2, assume first that the capacitor 40 is completely discharged to ground. When there is no signal provided to the terminal 50 from the Z-axis amplifier 22 and there is no potential on the base of the transistor 58 due to a charge across the capacitor 40, the transistor 52, 54 are nonconductive and the transistors 56, 58 are conductive. Because the transistor 54 is nonconductive, the potential on its collector, which is transferred to the base of the charging transistor 74, is high and the transistor 74 is thus nonconductive. At the same time, the signal provided to the base of the charging transistor 76 from the first multivibrator 26 is high and that transistor 76 is nonconductive. The signal provided to the transistor 134 from the first multivibrator 26 is low, and that transistor is nonconductive. The output of the comparator 136 at that time is high which maintains the transistor 94 conductive. Similarly, the transistor 111 is receiving a low signal on its base from the second multivibrator 28 and that transistor is conducting. This causes the transistor 96 to be conductive and to maintain the capacitor 40 discharged to ground potential. At this time, the output transistor 112, 114 will both be conductive. It is noted, however, that the transistor 114 is connected in circuit between +DC and —DC potentials, so that the movable arm of the potentiometer 122 may be set to provide zero output signals on the terminal 124.

Referring momentarily to FIG. 1, it is seen that when a signal is received by the pulse height selector 24 from the Z-axis amplifier 22 of sufficient amplitude to pass through the pulse height selector, its output signal initiates several actions simultaneously. First, that signal from the pulse height selector actuates both of the one-shot multivibrators 26, 28. The multivibrator 26 provides a negative-going signal to the decay circuits 30, 32, 34 and a positive-going signal to the comparison circuit 36. Simultaneously, the second multivibrator 28 provides a positive-going signal to the decay circuits 30, 32, 34. Of course, positive-going X-axis coordinate signals are provided to the X-axis decay circuit 30 from the X-axis amplifier 18, and similar Y-axis coordinate signals are provided to the Y-axis decay circuit 32 from the Y-axis amplifier 20. A sum or Z-axis signal is provided to the Z-axis decay circuit 34 from the Z-axis amplifier 22, and the output signal of the selector 24 is supplied to the pulse shaper and delay circuit 38 and to the counter 39.

Referring again to the circuit shown in FIG. 2, the positive-going signal provided to the terminal 50 from the Z-axis amplifier 22 causes the base of the transistor 52 to be at a more positive potential than the base of the transistor 58. This causes the transistors 52, 54 to become conductive, which drops the collector potential of the transistor 54. This drop in potential is transferred to the base of the transistor 74 in the charging circuit 44 and causes the transistor 74 to become conductive. Simultaneously, the negative-going signal provided to the input terminal 94 from the multivibrator 26 causes the base of the transistor 76 to become negative with respect to its emitter, and that transistor also becomes conductive. Thus the charging path is established for the capacitor 40 from the +DC line 60 through the resistor 88, the transistors 76, 74, the diodes 82, 70, and the resistor 68. The capacitor 40 will continue to charge so long as the input signal to the base of the transistor 52 is greater in amplitude than the charge across the capacitor. When the amplitude of the input signal at the terminal 50 starts to decrease, the potential on the base of the transistor 58 will be greater than that on the base of the transistor 52, and the transistors 52, 54 will become nonconductive. This raises the potential on the base of the charging transistor 74 and causes that transistor to become nonconductive. Thus, the charging path for the capacitor 40 is interrupted and the capacitor will hold whatever charge it has attained at that time. In other words, the peak detector 42 permits the capacitor 40 to charge up to a potential substantially equal to the amplitude of the input pulse presented to the terminal 50, and then causes it to retain that charge.

In order that a charge may be retained by the capacitor 40, it is necessary that both of the discharge transistors 94, 96 be nonconductive. This is accomplished for the transistor 94 by the positive-going signal applied to the base of the transistor 134 in the comparison circuit 36. That signal causes the transistor 134 to become conductive, which causes the base of the discharge transistor 94 to go negative and cuts off that transistor. Simultaneously, the positive-going signal provided to the terminal 130 from the second one-shot multivibrator 28 causes the transistor 111 to become nonconductive. This decreases the potential on the base of the discharge transistor 96 and causes that transistor to become nonconductive. Thus, there is no discharge path for any charge built up across the capacitor 40 until one or the other or both of the transistor 94, 96 again become conductive.

The positive charge across the capacitor 40 is transferred to the base of the transistor 112 in the output stage 48. This causes the transistor 112 to conduct more heavily, which, in turn, increases the conduction of the transistor 114, and provides a positive output signal at the terminal 124 and on the lead 126.

Figure 3:
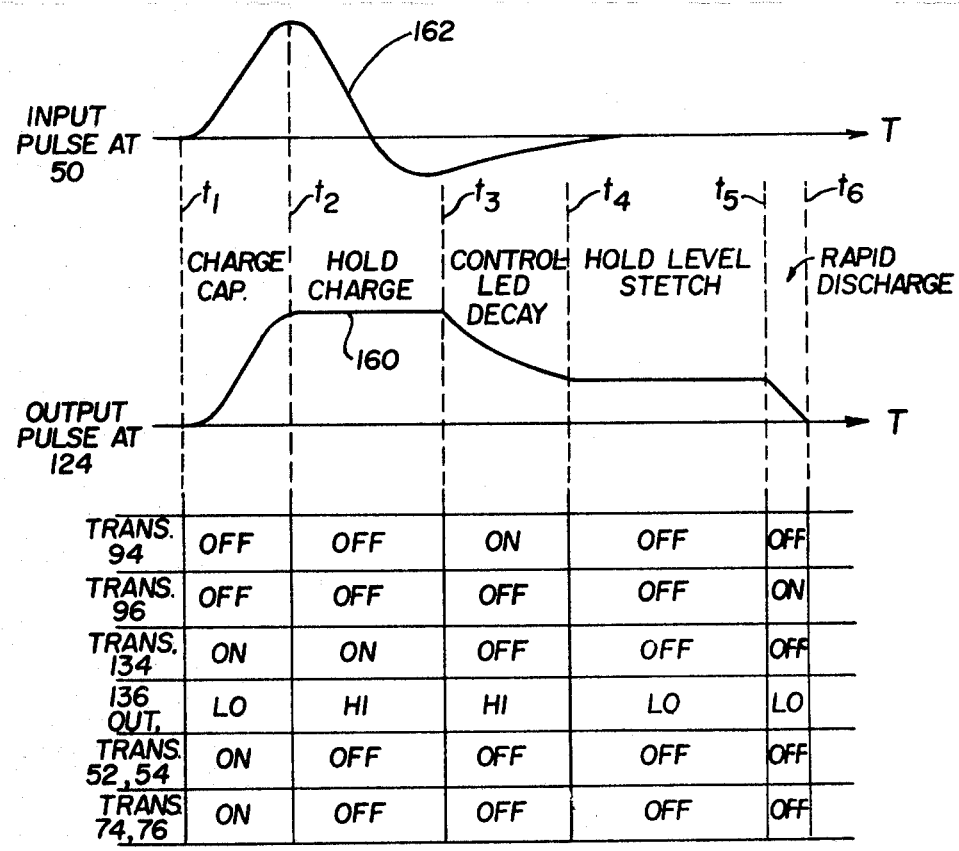
FIG. 3 is a combined waveform diagram and table useful in understanding the conditions of various elements shown in FIG. 2.

FIG. 3 illustrates a signal 160 provided at the output terminal 124 in response to an input pulse signal 162 provided at the terminal 50 from the Z-axis amplifier 22. It is seen that during an initial time period $t_1$–$t_2$, the transistors 52, 54, 74, 76 are all on, and the transistors 94, 96 are both off. Thus, there is a charging path for the capacitor 40, but no discharge path.

After the charge has been held by the capacitor 40 for a predetermined length of time determined by the period of the first multivibrator 26, the control signals from that multivibrator reverse polarity. The period of the one-shot multivibrator 26 is determined by the longest anticipated rise time of input pulses to the decay circuits from the X-axis, Y-axis and Z-axis amplifiers 18, 20, 22. Of course, this may be adjusted for various applications.

At a time $t_3$, the signal provided to the base of the transistor 134 from the multivibrator 26 goes low. This causes that transistor to become nonconductive. At that time, the output of the comparator 136 is high, which causes the discharge transistor 94 to become conductive. This initiates a controlled exponential decay of the charge built up across the capacitor 40. The time constant of the decay circuit is determined, of course, by the values of the capacitor 40 and the resistor 98 in the discharge path. The exponential decay of the charge across the capacitor 40 is transferred through the output stage 48 to the output terminal 124 as shown by the decay in the waveform 160 (FIG. 3) between the times $t_3$ and $t_4$.

The time constants of all three decays circuits for X-axis, Y-axis and Z-axis circuits may easily be made substantially identical by the choice of capacitors and resistors. These are inactive components whose characteristics are relatively insensitive to environmental changes.

When the output signal on the terminal 124 and on the lead 126 has decayed to an amplitude level just slightly less than that provided to the comparator 136 from the voltage divider 144, the output of the comparator 136 goes from high to low. This decreases the potential on the base of the discharge transistors 94 and terminates the discharge of the capacitor 40 through that transistor. This occurs at time $t_4$ as shown in FIG. 3. The output signal 160 maintains the amplitude level that it had when conduction through the transistor 94 ceased. This is shown between time $t_4$ and $t_5$ in FIG. 3.

The length of time between $t_1$ and $t_5$ is determined by the period of the second multivibrator 28. This time may be varied for different applications, but, of course, is set to provide sufficient time between the times $t_4$ and $t_5$ for the Z-axis signal to pass from the pulse height selector 24 through the shaper and delay circuit 38 and brighten the trace on the CRT 12 at sometime during the period between $t_4$ and $t_5$. At that time, the X-axis and Y-axis signals will have decayed, but will have exactly the same amplitude ratios to the Z-axis signal as the original X and Y-axis signals had to the original Z-axis signal. In this manner, statistical fluctuations in the signals are completely eliminated and do not affect the position of the brightened spot on the cathode ray tube.

At time $t_5$ the output of the second one-shot multivibrator 28 goes from high to low. This signal provided to the terminal 130 and thence to the base of the transistor 111 causes the transistor 111 to become conductive. This, in turn, raises the potential on the base of the transistor 96 above the level of the −DC line 64 and causes that transistor to become conductive. This permits a rapid discharge of the capacitor 40 essentially to ground level. The capacitor 40 remains in that condition until the next input pulse is received at the terminal 50 from the Z-axis amplifier 22.

It is again pointed out that the decay circuits 30, 32, 34 are identical, but the circuit 34 is shown in FIG. 2 because only the Z-axis signal is used to actuate the comparison circuit 36. The comparison circuit 36 provides the same output signal to all three of the transistors 94 in the three decay circuits 30, 32, 34, so that the charges on all three capacitors 40 in the three decay circuits are held constant at the same time for measurement purposes.

It was previously mentioned that the circuitry could be modified to accept and act on both positive and negative position coordinate signals such as would be obtained from the computer circuits of Anger. In some instances, this may provide a more linear CRT display than is obtainable using only positive signals. It would entail using five controlled decay circuits of the type disclosed herein. In addition to three decay circuits such as are shown in FIG. 2 for responding to positive X, Y and Z-axis signals, two modified circuits are required for responding to negative X and Y-axis signals. These latter two circuits would be similar to that shown in FIG. 2, but polarities of certain components would be reversed from those shown. For example, the circuit for charging the capacitor 40 would be altered so that current flow is from ground, through the capacitor 40, the resistor 68, the diodes 70, 82, and two transistors corresponding to the transistors 74, 76, to a source of negative potential. These and other necessary modifications are believed to be apparent and well within the capabilities of one skilled in the art without further explanation.

What is claimed is:
1. In a scintillation detector having means for providing X-axis and Y-axis pulse signals indicative of position, in a rectangular coordinate system, of a scintillation occurring in a scintillator and a sum pulse signal indicative of energy of said scintillation, an indicating system comprising:
   (a) indicator means responsive to said X-axis and Y-axis signals and to said sum signal for providing a visible indication of said position of said scintillation in said coordinate system;
   (b) pulse stretcher and controlled decay means connected to receive said X-axis, Y-axis and sum pulse signals for subjecting said signals to decays at equal rates until said sum signal has decayed to a predetermined reference level, and for holding said X-axis and Y-axis signals at their respective levels to which they have decayed when said sum signal has decayed to said reference level; and
   (c) means for providing said X-axis, Y-axis and sum signals to said indicator means to provide said visible indication at a position determined by said levels to which said X-axis and Y-axis signals have decayed.

2. The system of claim 1, wherein said pulse stretcher and decay means includes peak detector means for holding said X-axis, Y-axis and sum pulse signals at their respective peak amplitudes for a first predetermined period of time after start of said signals before their decays.

3. The system of claim 2, wherein said decays are exponential decays and all three said signals decay with substantially identical time constants.

4. The system of claim 2, further including a pulse height selector for actuating said pulse stretcher and controlled decay means only when said sum signal lies within a predetermined amplitude range.

5. The system of claim 4, wherein said decays are exponential decays and all three said signals decay with substantially identical time constants.

6. The system of claim 2, wherein said pulse stretcher and controlled decay means comprise capacitor means.

7. The system of claim 6, further including discharge means for rapidly discharging said capacitor means after a second predetermined period of time after start of said signals.

8. The system of claim 1, wherein said decays are exponential decays and all three said signals decay with substantially identical time constants.

9. The system of claim 8, further including delay means for providing said sum signal to said indicator means after said sum signal has decayed to said reference level.

10. The system of claim 1, further including a pulse height selector for actuating said pulse stretcher and controlled decay means only when said sum signal lies within a predetermined amplitude range.

11. The system of claim 10, wherein said decays are exponential decays and all three said signals decay with substantially identical time constants.

12. The system of claim 11, further including delay means for providing said sum signal to said indicator means after said sum signal has decayed to said reference level.

13. The system of claim 10, further including delay means for providing said sum signal to said indicator means after said sum signal has decayed to said reference level.

14. The system of claim 10, wherein said pulse stretcher and controlled decay means comprise capacitor means.

15. The system of claim 14, further including discharge means for rapidly discharging said capacitor means after a second predetermined period of time after start of said signals.

16. The system of claim 1, further including delay means for providing said sum signal to said indicator means after said sum signal has decayed to said reference level.

17. The system of claim 16, wherein said pulse stretcher and controlled decay means comprise capacitor means.

18. The system of claim 17, further including discharge means for rapidly discharging said capacitor means after a second predetermined period of time after start of said signals.

19. The system of claim 1, wherein said pulse stretcher and controlled decay means comprise capacitor means.

20. In a scintillation detector having means for providing X-axis and Y-axis pulse signals indicative of position, in a rectangular coordinate system, of a scintillation occurring in a scintillator and a sum pulse signal indicative of energy of said scintillation, an indicating system comprising:
 (a) indicator means responsive to said X-axis and Y-axis signals and to said sum signal for providing a visible indication of said position of said scintillation in said coordinate system;
 (b) a pulse height selector connected to receive said sum signal and provide an actuating signal when said sum signal lies within a predetermined amplitude range;
 (c) control means connected to receive said actuating signal and provide a first control signal for a first predetermined period of time after first receiving said actuating signal;
 (d) X-axis signal, Y-axis signal, and sum signal pulse stretcher and controlled decay circuits respectively connected to receive said X-axis, Y-axis and sum signals and all connected to receive said first control signal and respectively provide X-axis, Y-axis and sum output signals, each said pulse stretcher and controlled decay circuit including
   (i) a capacitor for providing said output signals,
   (ii) a charging circuit for said capacitor,
   (iii) a peak detector for controlling said charging circuit to charge said capacitor to peak amplitude of a received signal and hold that charge until termination of said first controlled signal, and
   (iv) a decay circuit connected to said capacitor for providing an exponential decay of said charge upon termination of said first control signal and until receipt of a second control signal and then maintaining that decayed charge level;
 (e) a comparison circuit connected to receive the sum output signal from the capacitor in the sum signal pulse stretcher and decay circuit and provide said second control signal to all said decay circuits when said sum output signal has decayed to a predetermined reference amplitude level; and
 (f) means for providing said X-axis and Y-axis output signals and said sum signal to said indicator means to provide said visible indication at a position determined by said X-axis and Y-axis output signals.

21. The system of claim 20, further including delay means for providing said sum signal to said indicator means after said sum signal has decayed to said reference level.

22. The system of claim 20, wherein each said pulse stretcher and decay circuit further includes a discharge circuit for rapidly discharging said capacitor after a second predetermined period of time after provision of said actuating signal.

References Cited

UNITED STATES PATENTS 3,327,116   6/1967   Loveday _____ 250—71.5

RODNEY D. BENNETT, Jr., Primary Examiner

T. H. TUBBESING, Assistant Examiner

U.S. Cl. X.R.

250—71.5; 315—22, 30